(12) United States Patent
Kaneko et al.

(10) Patent No.: US 8,177,356 B2
(45) Date of Patent: May 15, 2012

(54) NON-AQUEOUS INK-JET INK AND INK-JET RECORDING METHOD

(75) Inventors: Manabu Kaneko, Tokyo (JP); Hisato Kato, Tokyo (JP)

(73) Assignee: Konica Minolta IJ Technologies, Inc, Tokyo (JP)

( * ) Notice: Subject to any disclaimer, the term of this patent is extended or adjusted under 35 U.S.C. 154(b) by 234 days.

(21) Appl. No.: 12/742,104

(22) PCT Filed: Mar. 5, 2008

(86) PCT No.: PCT/JP2008/053943
§ 371 (c)(1),
(2), (4) Date: May 10, 2010

(87) PCT Pub. No.: WO2009/063656
PCT Pub. Date: May 22, 2009

(65) Prior Publication Data
US 2010/0265309 A1    Oct. 21, 2010

(30) Foreign Application Priority Data

Nov. 14, 2007  (JP) .................. 2007-295332

(51) Int. Cl.
B41J 2/01    (2006.01)
(52) U.S. Cl. ........................................ 347/105

(58) Field of Classification Search ............... None
See application file for complete search history.

(56) References Cited

FOREIGN PATENT DOCUMENTS

| | | |
|---|---|---|
| JP | 2000086952 | 3/2000 |
| JP | 2000515920 | 11/2000 |
| JP | 2002501965 | 1/2002 |
| JP | 2002526631 | 8/2002 |
| JP | 2005015672 | 1/2005 |
| JP | 2005036199 | 2/2005 |
| JP | 2005060716 | 3/2005 |
| JP | 2008044981 | 2/2008 |
| WO | 2004007626 | 1/2004 |

*Primary Examiner* — Stephen Meier
*Assistant Examiner* — Alexander C Witkowski
(74) *Attorney, Agent, or Firm* — Lucas & Mercanti, LLP

(57) ABSTRACT

A non-aqueous ink-jet ink which has printability on non-absorbing recording media such as polyvinyl chloride (abrasion resistance and water resistance), is excellent in ejection stability and safety, is free from problems concerning odor, does not cause operational abnormality in an ink-jet head even in long-term use, and can be stably used even after long-term storage. Also provided is a method of ink-jet recording with the ink. This non-aqueous ink-jet ink comprises a pigment, a binder resin, and an organic solvent. It is characterized in that at least 60 mass % of the organic solvent is accounted for by a water-soluble organic solvent and that the content in the ink of a metal salt which is the highest in content among the salts of metals selected among sodium, potassium, magnesium, and calcium is 3-50 ppm in terms of metal-ion concentration.

7 Claims, No Drawings

NON-AQUEOUS INK-JET INK AND INK-JET RECORDING METHOD

CROSS REFERENCE TO RELATED APPLICATION

This is a U.S. National Phase Application under 35 U.S.C. 371 of International Application PCT/JP2008/053943, filed Mar. 5, 2008, which claims the priority of Japanese Application No. 2007-295332, filed Nov. 14, 2007, the entire content of both Applications are hereby incorporated by reference.

TECHNICAL FIELD

The present invention relates to a non-aqueous ink-jet ink and an ink-jet recording method.

BACKGROUND

Recently, ink-jet recording system has been applied in various fields of printing works such as photograph imaging, various types of printings, markings and a specific printing such as a color filter because it enable to form an image easily and with low cost.

Ink-jet ink used for the ink-jet recording includes various types of ink such as an aqueous ink containing water as a principal solvent, an oil-based ink principally containing a non-volatile solvent at room temperature and substantially containing no water, a non-aqueous ink principally containing a solvent volatile at room temperature and substantially containing no water, a hot-melt ink which is solid at room temperature and thermally melted for printing and an active light curable ink capable of curing by active rays such as light, which are selected in accordance with the use.

Besides, a recording medium made from plastics such as polyvinyl chloride and polyethylene is used for outdoor notice board which is required to have a weather resistance for a long period and ability of contacting with a curved surface is used, particularly a medium made from sofi polyvinyl chloride is used in wide field of use. The ink-jet recording method is applied as a method suitable for making small amount and diverse kinds of printing matters since plate making is not necessary and the time for finishing is short in such system, though many methods are applied for printing an image on the polyvinyl chloride.

Hitherto, the non-aqueous ink containing cyclohexanone as the principal solvent is used on the occasion of printing on the soil polyvinyl chloride recording medium, for example, an ink-jet ink containing cyclohexanone is disclosed (cf. Patent Document 1). Cyclohexanone has high dissolving ability for soft polyvinyl chloride so that the pigment contained in the ink is come into soft polyvinyl chloride. Therefore, high abrasion resistance and high glossiness of the printed matter can be obtained. However, cyclohexanone is regulated as the First Class Organic Solvent and causes a problem of safety and a local exhaust system is necessary on the occasion of handling the ink-jet ink containing cyclohexanone. Further, organic solvents such as cyclohexanone has potent odor and has issues of long-lasting odor of a printed matter as well as being burden to workers.

In contrast to that, non-aqueous ink containing no cyclohexanone is developed and marketed. For example, non-aqueous inks containing a water soluble organic solvent such as N-methylpyrrolidone and lactone as the solvent capable of dissolving polyvinyl chloride in place of cyclohexanone causing the above problems are disclosed, cf. Patent Documents 2 and 3. Moreover, a non-aqueous ink containing a fixing resin such as a vinyl chloride-vinyl acetate copolymer and an acryl resin for improving the fastness of the image such as abrasion resistance is disclosed, cf. Patent Documents 4 and 5. An ink-jet ink which is inhibited some degree in the odor thereof and has the abrasion resistivity of image formed thereby on polyvinyl chloride medium can be obtained by such constitution.

However, in the case of using above water soluble organic solvent, it was found that an abrasion resistance or a water resistance of a printed image was deteriorated after long period storage and also a gloss of printed image was deteriorated, even if using an ink caused no defect immediately after an ink preparation. Further it was found that in some cases, unstable ejection from an inkjet head occurs and results in a misfire during printing. Moreover, it was found that the operational abnormality of the ink-jet printing head is caused in long-term use in some cases using such organic solvent. Accordingly, any non-aqueous ink-jet ink is not obtained yet, which has no problem of the safeness and odor and sufficient suitability for printing onto polyvinyl chloride and can be used for a long period.

Patent Document 1: Japanese translation of PCT international application 2002-526631
Patent Document 2: Unexamined Japanese Patent Application (hereinafter, refers to as JP-A) No. 2005-15672
Patent Document 3: JP-A 2005-60716
Patent Document 4: JP-A 2005-36199
Patent Document 5: WO 2004/007626

DETAILED EXPLANATION OF THE INVENTION

Problems to be Solved by the Present Invention

The present invention is attained on the above background. An object of the invention is to provide a non-aqueous ink-jet ink which has printing suitability (abrasion resistance and water resistance) for a non-absorbable recording medium such as polyvinyl chloride recording medium and is superior in the ejection stability and safeness without problem of odor and does not cause operational abnormality of the ink-jet head during for a prolonged period so as to be stably used, and an ink-jet recording method using the same ink-jet ink.

Means to Solve the Problems

The above object of the invention can be attained by the following constitution.

1. A non-aqueous ink-jet ink comprising a pigment, a resin for fixing an image and an organic solvent, wherein
60% or more by mass of the total mass of the organic solvent is accounted for by a water soluble organic solvent, and
a content of a metal salt which is the highest in content among the salts of metals selected from the group of sodium, potassium, magnesium and calcium is 3 ppm to 50 ppm in terms of a concentration of a metal ion.

2. The non-aqueous ink-jet ink of item 1, wherein
the water soluble organic solvent comprises at least one selected from the group of glycol-based solvents, a nitrogen-containing heterocyclic compound, a sulfoxide compound and a sulfolane compound.

3. The non-aqueous ink-jet ink of item 1, wherein
the water soluble organic solvent comprises Compound (A) and Compound (B),
a content of Compound (A) is 1.5% to 30% by mass, and
a content of Compound (B) is 50% to 90% by mass;

wherein Compound (A) is at least one selected from the group of compound represented by Formula (1) and Formula (2):

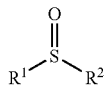

Formula (1)

wherein $R^1$ and $R^2$ each independently represent a group having 1-6 carbon atoms, and $R^1$ and $R^2$ may be jointed to form a ring,

Formula (2)

wherein $R^3$ and $R^4$ each independently represent a group having 1-6 carbon atoms, and $R^3$ and $R^4$ may be jointed to form a ring;
wherein Compound (B) is at least one selected from the group of compound represented by Formula (3):

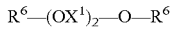

Formula (3)

wherein $R^5$ and $R^6$ each independently represent a methyl group or an ethyl group; and $OX^1$ represents an oxyethylene group or an oxypropylene group.
4. The non-aqueous ink-jet ink of item 3,
wherein the Compound (B) is at least one selected from the group of diethyleneglycol diethyl ether, dipropyleneglycol dimethyl ether, and dipropyleneglycol diethyl ether.
5. The non-aqueous ink-jet ink of any one of items 1 to 4, wherein the resin for fixing an image is produced by a solution polymerization method.
6. The non-aqueous ink-jet ink of any one of items 1 to 5, wherein the resin for fixing an image has a number average molecular weight of from 10,000 to 30,000; and
the resin is one selected from the group of a vinyl chloride-vinyl acetate copolymer, a vinyl chloride-vinyl acetate-maleic anhydride copolymer, a vinyl chloride-vinyl acetate-vinyl alcohol copolymer and a vinyl chloride-vinyl acetate-hydroxyalkyl acrylate copolymer.
7. An inkjet recording method of forming an image on a recording medium by using the non-aqueous ink-jet ink of any one of items 1 to 6, wherein the recording medium comprising one selected from the group of a polyvinyl chloride or a resin substrate without a plasticizer and an non-absorbable inorganic substrate.

Effects of the Invention

The present invention made it possible to provide a non-aqueous ink-jet ink and an inkjet recording method thereby which exhibit printing suitability (abrasion resistance, water resistance) on non-absorbable recording medium such as polyvinyl chloride, excellent ejecting stability and safety, no odor, usable long period without operational abnormality of the inkjet head during the prolonged using period, and usable stable after storage of long period storage.

DESCRIPTION OF THE PREFERRED EMBODIMENT

The best embodiment for embodying the invention is described in detail below.

As a result of various investigations by the inventors on the non-aqueous ink-jet ink, it is found that a non-aqueous ink-jet ink containing a water soluble organic solvent 60% or more by mass wherein a content of a metal salt which is the highest in content among the salts of metals selected from the group of sodium, potassium, magnesium and calcium is 3 ppm to 50 ppm in terms of a concentration of a metal ion results in improving an image storage stability and stable ejecting after long-term ink storage.

Herein, a non-aqueous ink-jet ink (hereinafter, simply refer to as an ink) refers to an ink-jet ink in which all solvent comprises an organic solvent without purposefully adding water in an ink preparation process and an aqueous ink refers to an ink in which water is added purposefully as an component of ink solvent. Further a water soluble organic solvent refers to an organic solvent which can be mixed with water in any ratio.

As a result of investigation as to this phenomenon, it is found to be the specific phenomenon occurring in a non-aqueous ink-jet ink having a water soluble organic solvent of 60% or more by mass. This phenomenon remarkably occurs in the case of the water soluble organic solvent containing one or more compounds selected from the group of a sulfoxide compound and a sulfolane compound represented by foresaid Formulas (1) and (2) according to the present invention. However, it is found that this phenomenon does not occur in the case that a content of a metal salt which is the highest in content among salts of metals selected from the group of sodium, potassium, magnesium and calcium is 50 ppm or more in terms of a concentration of a metal ion.

Further, by analyzing an ink which has a content of a metal salt which is the highest in content among the salts of metals selected from the group of sodium, potassium, magnesium and calcium being 50 ppm or more in terms of a concentration of a metal ion, it was found that a crystal of foresaid metal salt in the size of a few to a few ten μm existed in an ink sealed and stored more than 6 months, provided that no particle having a diameter more than 1 μm was observed in an ink via filtration by filer during a ink preparation process.

When an image is formed by an ink-jet recording apparatus by using an ink having a crystal of foresaid metal salt in the size of a few to a few ten μm, a filter in an internal of an ink-jet head is clogged, ejection becomes unstable, or a metal salt in the order of a few ten μm exist in an image portion after forming an image by printing and the metal salt tend to fall out of the image portion. Therefore it is presumed that an ink having a crystal of foresaid metal salt in the size of a few to a few ten μm causes deterioration of abrasion resistance or water resistance.

On the contrary, in an aqueous ink-jet ink or a non-aqueous ink-jet ink having water soluble organic solvent in the rage less than 60% by mass, a crystal of foresaid metal salt in the size of a few ten μm or more is not generated in an ink sealed and stored more than 6 months during an ink preparation process and after filtration, provided that a content of a metal salt which is the highest in content among the salts of metals selected from the group of sodium, potassium, magnesium and calcium is 50 ppm or more in terms of a concentration of a metal ion.

Although the precise mechanism of the specific phenomena occurred in a non-aqueous ink-jet ink having water soluble organic solvent 60% or more by mass is as yet not well known, the mechanism of the phenomena is presumed as below.

A non-aqueous ink-jet ink which comprises a pigment, a fixing resin and an organic solvent is generally produced by dispersing a pigment in an organic solvent by using a disperser. A pigment as a raw material may be treated such as a salt-milling in some production method. During such treatment process, a metal salt such as sodium, potassium, magnesium or calcium may come to be mixed in as an impurity. When this pigment is dispersed in an organic solvent, a metal salt as an impurity is also pulverized together, resulting in fine particles of 1 μm or less immediately after preparation. Therefore fine metal salt particles are remained in an ink without filtration and removal, provided that an ink is filtered by using filter. In these situations, when an ink contains 60% or more of a water soluble organic solvent, this water soluble organic solvent as a raw material contain a small amount of water or when a water soluble organic solvent absorbs moisture in air during dispersion or agitation in an ink preparation, just a few water may be mixed into an ink. Due to this slight water in an ink, a part of a metal salt which is pulverized into 1 μm or less becomes soluble in an ink during long period storage, repeats adhering to an insoluble crystalline and recrystallization, resulting in growing a crystalline of a metal salt to be a few μm to a few ten μm.

On the contrary, when a content of a water soluble organic solvent is less than 60% by mass, even in the case of an aqueous ink-jet ink or a non-aqueous ink-jet ink, the phenomena above does not occur. It is presumed that a metal salt is dissolved in large amount of water which comprises an ink and crystalline of a metal salt itself does not exist, even if an aqueous ink contains a metal salt of 50 ppm or more such as sodium, potassium, magnesium and calcium. Further, it is presumed that even in a non-aqueous ink, in the case of an ink having a content of water soluble organic solvent less than 60% by mass, few water is mixed in an ink, and a metal salt finely pulverized at pigment dispersion process cannot be dissolved and recrystallized, is remained in finely pulverized state and does not grow crystalline to a few μm or more. Therefore it is presumed that the phenomena above does not occur, provided that a content of a water soluble organic solvent is less than 60% by mass during long period storage.

For the reasons above, when a content of a metal salt which is the highest in content among the salts of metals selected from the group of sodium, potassium, magnesium and calcium is 3 ppm to 50 ppm in terms of a concentration of a metal ion. in a non-aqueous ink-jet ink having 60% or more by mass of a water soluble organic solvent, a growth of metal salt crystalline is inhibited even in long period ink storage, resulting in effects on an image storage properties and an ejecting stability. Preferably a content of these metal salts is 3 ppm or more and 30 ppm or less.

According to the present invention, a method to control a content of a metal salt which is the highest in content among the salts of metals selected from the group of sodium, potassium, magnesium and calcium being 50 ppm or less in terms of a concentration of a metal ion is not limited. Specific example include a method: before an ink preparation, a metal salt as an impurity is removed by washing a pigment by pure water, a metal salt in an ink is dare to growth up to 1 μm or more and removed by filtration of 1 μm filter, as well as selecting a raw material pigment having a least content of metal salt above as an impurity.

Though it is preferred to reduce a content of a metal salt according to above method because it results in improving an image storage properties and an ejecting stability even in long period ink storage, it is necessary to repeat washing of pigment several times for reducing a metal ion concentration in an ink to being less than 3 ppm, resulting in higher production costs. Therefore 3 ppm or more is preferable.

Quantity of a metal salt such as sodium, potassium, magnesium and calcium in an ink can be determined as a concentration of a metal ion by acid decomposition by closed micro wave wet type decomposition apparatus followed by ICP emission spectrophotometer or ICP mass spectrometer.

The constitution of the non-aqueous ink-jet ink of the invention is concretely described below.

An inkjet ink of the present invention contains 60% or more by mass of a water soluble organic solvent, especially preferable to use an organic solvent containing Compound (A) and Compound (B).

Compound (A) preferably contains one or more kinds of compound selected from the group consisting of sulfoxide compounds and sulfone compounds represented by Formula (1) and (2) respectively.

In Formula (1), $R^1$ and $R^2$ are each a substituent having 1 to 6 carbon atoms, for example, a straight or branched chain alkyl group such as a methyl group, an ethyl group, an n-propyl group and an isopropyl group; an alkyl group substituted by a hetero atom such as a hydroxyethyl group, an acetyl group and an acetonyl group; a cyclic group such as a cyclohexyl group and a phenyl group, and an aromatic substituent, and $R^1$ and $R^2$ may be the same or different and may be linked for forming a ring.

In Formula (2), $R^3$ and $R^4$ are each a substituent having 1 to 6 carbon atoms, for example, a straight or branched chain alkyl group such as a methyl group, an ethyl group, an n-propyl group and an isopropyl group; an alkyl group substituted by a hetero atom such as a hydroxyethyl group, an acetyl group and an acetonyl group; a cyclic group such as a cyclohexyl group and a phenyl group, and an aromatic substituent, and $R^3$ and $R^4$ may be the same or different and may be linked for forming a ring.

Examples of the compound represented by Formula (1) or (2) include dimethyl sulfoxide, diethyl sulfoxide, methyl ethyl sulfoxide, diphenyl sulfoxide, tetraethylene sulfoxide, dimethylsulfone, methyl ethyl sulfone, methyl isopropyl sulfone, methyl hydroxyethyl sulfone and sulforane.

The content of Compound (A) in the ink-jet ink is preferably from 1.5% to 30%, more preferably from 3% to 20%, and still more preferably from 5% to 15% by mass. When the content of Compound (A) is equal to or more than 1.5% by mass, sufficient abrasion resistance can be achieved to an image formed on polyvinyl chloride. When the content is below 30% by mass, operational abnormality of the ink-jet head after long term use can be prevented.

The ink-jet ink of the invention may prefer to contain Compound (B) constituted by at least one compound selected from the group consisting of compounds the foregoing Formula (3).

In Formula (3), $R^5$ and $R^6$ each represent a methyl group or an ethyl group and $OX^1$ represent an oxyethylene group or an oxypropylene group.

Examples of the compounds represented by Formula (3) of the invention include diethylene glycol dimethyl ether, diethylene glycol diethyl ether, dipropylene glycol dimethyl ether, and dipropylene glycol diethyl ether.

Among them, at least one selected from the group of diethylene glycol diethyl ether, dipropylene glycol dimethyl ether and dipropylene glycol diethyl ether is preferable as the component of Compound (B), by which the fast drying ability of the image printed on polyvinyl chloride can be further improved.

The content of Compound (B) in the ink-jet ink is preferably from 50% to 90% by mass. The fast drying ability of image printed on polyvinyl chloride and the ejection stability is improved and the odor of the ink can be reduced by such solvent constitution.

The ink-jet ink of the invention may contain a known organic solvent other than Compound (A) and Compound (B) within the range in which the object of the invention is not vitiated. Examples of such solvent include a nitrogen containing heterocyclic compound such as N-methylpyrolidone and 1,3-dimethyl imidazolidinone; a lactone compound such as γ-butylolactone; a glycol diacetates such as ethylene glycol diacetate, propylene glycol diacetate; an alkylene glycol monoalkyl ether such as diethylene glycol monoethyl ether, triethylene glycol monomethyl ether, dipropylene glycol monomethyl ether and tripropylene glycol monomethyl ether, and an alkylene glycol monoalkyl ether acetate such as ethylene glycol monobutyl ether acetate.

The pigment relating to the invention is described below.

The weather resistance of the image recorded on the recording medium made from plastics such as polyvinyl chloride can be improved by using a pigment as the colorant of the non-aqueous ink-jet ink of the invention.

Any known pigments can be used as the pigment to be used in the invention without any limitation, for example, insoluble pigments, organic pigments such as lake pigments and inorganic pigments such as carbon black are preferably used.

As the insoluble pigment, for example, an azo, an azomethine, a methine, a diphenylmethane, a triphenylmethane, a quinacridone, an anthraquinone, a perylene, an indigo, a quinophthalone, an isoindolinone, an isoindoline, an azine, an oxazine, a thiazin, a dioxazine, a thiazole, a phtlocyanine and diketopyrolopyrrole type pigments are preferred.

As the pigment preferably to be used, for example, the following pigments can be cited.

Examples of a magenta and red pigment include C.I. Pigment Red 2, C.I. Pigment Red 3, C.I. Pigment Red 5, C.I. Pigment Red 6, C.I. Pigment Red 7, C.I. Pigment Red 12, C.I. Pigment Red 15, C.I. Pigment Red 16, C.I. Pigment Red 48 (Ca), C.I. Pigment Red 48 (Mn), C.I. Pigment Red 48:1, C.I. Pigment Red 53:1, C.I. Pigment Red 57 (Ca), C.I. Pigment Red 57:1, C.I. Pigment Red 112, C.I. Pigment Red 122, C.I. Pigment Red 123, C.I. Pigment Red 139, C.I. Pigment Red 144, C.I. Pigment Red 149, C.I. Pigment Red 166, C.I. Pigment Red 168, C.I. Pigment Red 168, C.I. Pigment Red 177, C.I. Pigment Red 178, C.I. Pigment Red 184, C.I. Pigment Red 202, C.I. Pigment Red 209, C.I. Pigment Red 222, C.I. Pigment Red 254 and C.I. Pigment Violet 19.

Examples of an orange or yellow pigment include C.I. Pigment Orange 32, C.I. Pigment Orange 43, C.I. Pigment Yellow 1, C.I. Pigment Yellow 2, C.I. Pigment Yellow 3, C.I. Pigment Yellow 12, C.I. Pigment Yellow 13, C.I. Pigment Yellow 14, C.I. Pigment Yellow 15, C.I. Pigment Yellow 15:3, C.I. Pigment Yellow 16, C.I. Pigment Yellow 17, C.I. Pigment Yellow 73, C.I. Pigment Yellow 74, C.I. Pigment Yellow 75, C.I. Pigment Yellow 83, C.I. Pigment Yellow 93, C.I. Pigment Yellow 95, C.I. Pigment Yellow 97, C.I. Pigment Yellow 98, C.I. Pigment Yellow 109, C.I. Pigment Yellow 110, C.I. Pigment Yellow 114, C.I. Pigment Yellow 120, C.I. Pigment Yellow 128, C.I. Pigment Yellow 129, C.I. Pigment Yellow 130, C.I. Pigment Yellow 138, C.I. Pigment Yellow 147, C.I. Pigment Yellow 150, C.I. Pigment Yellow 151, C.I. Pigment Yellow 154, C.I. Pigment Yellow 155, C.I. Pigment Yellow 180, C.I. Pigment Yellow1 85, C.I. Pigment Yellow 213 and C.I. Pigment Yellow 214.

Examples of a green or cyan pigment include C.I. Pigment Blue 1, C.I. Pigment Blue 2, C.I. Pigment Blue 3, C.I. Pigment Blue 15, C.I. Pigment Blue 15:2, C.I. Pigment Blue 15:3, C.I. Pigment Blue 15; 4, C.I. Pigment Blue 16, C.I. Pigment Blue 22, C.I. Pigment Blue 60 and C.I. Pigment Green 7.

When red, green, blue or intermediate color is required other than the above, the following pigments are preferably used singly or in combination, for example, C.I. Pigment Reds 209, 224,177 and 194;
C.I. Pigment Orange 43;
C.I. Vat Violet 3;
C.I. Pigment Violets 19, 23 and 37;
C.I. Pigment Green 36 and 7, and
C.I. Pigment Blue 15:6.

As a black pigment, for example, C.I. Pigment Black 1, C.I. Pigment Black 6 and C.I. Pigment Black 7 can be cited.

The content of these pigments in the ink of the invention is preferably from 2 to 10% by mass. A light colored ink is sometimes used for reducing the granularity of image. In such case, the content of the pigment is preferably reduced by ⅕ to ½.

The pigments relating to the invention are preferably used after dispersed by a dispersing machine together with a surfactant and an additive necessary for satisfying a designated purpose. As the dispersing machine, known dispersing machines such as a ball mill, a sand mill, an attritor, a roller mill, an agitator, a Henschel mixer, a colloid mill, an ultrasonic homogenizer, a pearl mill, a wet jet mill and a paint shaker are applicable.

The average particle diameter of the pigment dispersion to be used in the ink of the invention is preferably from 10 nm to 200 nm, and more preferably from 50 nm to 150 nm. The aggregation of the particles can be inhibited by making the average particle diameter to not less than 10 nm and the sedimentation of the pigment during storage for a prolonged period can be easily controlled by making the average particle diameter to not more than 200 nm. Therefore, the ink having good storage stability easily can be obtained by making the average particle diameter within the above range.

The particle diameter of the pigment dispersion can be measured by a particle diameter measuring apparatus available on the market utilizing a light scattering method, an electrophoretic method or a laser Doppler method. The average particle diameter also can be measured by using electron microscope. In such case, 100 or more particles are photographed and the resultant images are subjected to statistic treatment by using an image analyzing software such as Image-Pro, manufactured by Mediacybemetics Co., Ltd.

As the pigment dispersing agent, a surfactant and a polymer dispersant are usable and the polymer dispersant is preferred. Examples of the polymer dispersant include a (meth) acryl type resin, a styrene-(meth)acryl type resin, a hydroxyl group-containing carboxylic acid ester, a salt of a long chain polyaminoamide and a high molecular weight acid ester, a salt of high molecular weight polycarboxylic acid, a salt of a long chain polyaminoamide and a polar acid ester, a high molecular weight unsaturated acid ester, a modified polyurethane, a modified polyacrylate, a poly ether ester type anionic surfactant, a naphthalene sulfonic acid formalin condensate salt, an aromatic sulfonate formalin condensate salt, a polyoxyethylene alkylphosphate, polyoxyethylene nonylphenyl ether, stearylamine acetate and a pigment derivative.

Concretely, Johncryl manufactured by Johnson Polymer Co., Ltd., Anti-Terra-U manufactured by BYK Chemie Co., Ltd., Disperbyk manufactured by BYK Chemie Co., Ltd., Efka manufactured by Efka Chemicals Co., Ltd., Flowlen manufactured by Kyoei Kagaku Co., Ltd., Disparon manufactured by Kusumoto Kasei Co., Ltd., Ajisper manufactured by Ajinomoto Finetechno Co., Ltd., Demol, Homogenol and Emulgen each manufactured by Kao Co., Ltd., Solaparse manufactured by Avecia Co., Ltd., and Nikkol manufactured by Nikko Chemical Co., Ltd., are cited.

The dispersant content of the ink-jet ink of the invention is preferably from 10 to 200% by mass. The stability of the pigment dispersion is raised in the range of not less than 10% by mass and the ejection of the ink from the ink-jet head can be easily stabilized by making the content to not more than 200% by mass.

Various fixing resins (resins for fixing), hereinafter simply referred to as resin, is added to the ink-jet ink of the invention for improving fixing ability when the ink is printed on the recording medium of plastics such as polyvinyl chloride.

As the fixing resin, a polyvinyl chloride or a copolymer thereof such as a vinyl chloride type resin and a vinyl chloride-vinyl acetate copolymer are preferably used in view of substrate adhesion properties.

Concrete examples of the resin include a vinyl chloride type resin such as Solbin manufactured by Nisshin Kagaku Kogyo Co., Ltd., Vinibran manufactured by Nisshin kagaku Kogyo Co., Ltd., Salantex manufactured by Asahi Kasei Chemicals Co., Ltd., Sumielite manufactured by Sumitomo Kagaku Co., Ltd., Sekisui PVC manufactured by Sekisui Kagaku Kogyo Co., Ltd., and UCAR manufactured by Dow Chemical Co., Ltd.

As the fixing resin, an acryl type resin, a polyester type resin, a polyurethane type resin may be used in combination, other than a vinyl chloride type resin and a vinyl chloride-vinyl acetate copolymer.

Concrete examples of the resin include an acryl type resin such as Johncryl manufactured by Johnson Polymer Co., Ltd., and ESLEC P manufactured by Seldsui Co., Ltd., a polyester type resin such as ELITEL manufactured by Unitica Co., Ltd., and Vylon, manufactured by Toyobo Co., Ltd., and a polyurethane type resin such as Vylon UR manufactured by Toyobo Co., Ltd., NT-HiLamic, manufactured by Dainichi Seika Co., Ltd., Crysvon manufactured by Dainihon Ink Kagaku Kogyo Co., Ltd., and Nipporan manufactured by Nihon Polyurethane Co., Ltd.

The fixing resin functions as a binder for contacting the colorant such as a pigment with the recording medium after printing, and the adhesiveness and the durability are raised accompanied with the increasing in the molecular weight of the fixing resin. Lower molecular weight causes lowering in the viscosity of the ink and energy necessary for ejecting the ink on the occasion of printing is decreased accompanied with lowering of the viscosity so that the load to the ink-jet head is reduced and the ejection tends to be stable. Consequently the fixing after printing is sufficiently performed when the number average molecular weight is not less than 10,000 and the loading for ejecting the ink becomes excessively high when the molecular weight is not more than 30,000. Therefore, the molecular weight within the above range is preferred.

Particularly preferred rein is one having a number average molecular weight of from 10,000 to 30,000 and is comprised of at least one resin selected from a vinyl chloride-vinyl acetate copolymer, a vinyl chloride-vinyl acetate-maleic anhydride copolymer, a vinyl chloride-vinyl acetate-vinyl alcohol copolymer and vinyl chloride-vinyl acetate-hydroxyalkyl acrylate copolymer. The vinyl chloride-vinyl acetate copolymer and a vinyl chloride-vinyl acetate-maleic anhydride copolymer may be mixed for use, and the vinyl chloride-vinyl acetate copolymer or the vinyl chloride-vinyl acetate-maleic anhydride copolymer may be mixed with an acryl type resin, a polyester type resin or a polyurethane type resin.

The ejection stability, abrasion resistance and resistivity against alcohol wiping can be improved in suitable balance by adding the fixing resin to the ink of the invention.

The resistivity to wiping with alcohol of the present invention is a resistivity against deformation of the image such as peeling caused by wiping the image surface with ethanol or an ethanol-water mixture. Such wiping is necessary for removing dirt adhered on the image such as an outdoor poster.

For synthesis of the fixing resin relating to the invention, a usual polymerization method such as a suspension polymerization method, an emulsion polymerization method and a solution polymerization method can be applied without any limitation. Among them, the solution polymerization method is preferred.

The solution polymerization method is a method for radical polymerizing monomer having a vinyl group in which the monomer and a polymerization initiator are dissolved in a solvent capable of dissolving the polymer to be formed and polymerized by heating.

The fixing resin synthesized by the solution polymerization method is highly dissolvable even when the molecular weight is relatively high and relatively large amount of the resin can be contained in the ink. Therefore, the abrasion resistance can be improved.

The content of the fixing resin in the ink of the invention is preferably from 1 to 10% by mass. The content of not less than 1% by mass improves the weather resistance of image printed on polyvinyl chloride and that of not more than 10% by mass stabilizes the ink ejection ability. More preferable content range is from 3 to 7% by mass.

In the ink-jet ink of the invention, various kinds of known additive such as a viscosity controlling agent, a relative resistivity controlling agent, a film forming agent, a UV absorbent, an antioxidant, an anti-color fading agent, an anti-mold agent, a rust preventive and a stabilizing agent for vinyl chloride such as an anti-dehydrochlorination reaction agent may be added additional to the foregoing materials corresponding to the purposes of improving various properties of the ink such as the ejection stability, suitability for the print head or the ink cartridge, storage stability, an image storage stability and other performances.

The ink-jet head to be used on the occasion of image formation by ejecting the ink-jet ink of the invention may be either an on-demand type or a continuous type. The ejection system may be any of an electro-mechanical conversion system such as a single cavity type, a double cavity type, a bender type, a piston type, a share mode type and a shared wall type, and an electro-thermal conversion system such as a thermal ink-jet type and Bubble Jet® type.

In the ink-jet recording method using the ink-jet ink of the invention, an ink-jet recorded image can be obtained by ejecting the ink from the ink-jet head according to digital signals and adhering onto the recording medium using, for example, a printer in which the ink is charged. The image formation while raising the surface temperature of the image recording medium is preferable for fast and surely drying the ink adhering on the recording medium.

The surface temperature is preferably from 40 to 100° C. though the temperature is controlled corresponding to the durability of the recording medium or the drying ability of the ink. Particularly, it is more preferable that the recording is carried out while raising the surface temperature because the wetting ability of the ink with the recording medium surface is improved when polyvinyl chloride is used as the recording medium.

The wetting ability and the drying ability of the ink are varied sometimes depending on the kind of the polyvinyl chloride. Therefore, the surface temperature may be controlled according to the properties of the recording medium.

When the recording is carried out while the surface temperature of the recording medium is raised, a heater is preferably installed in the ink-jet recording apparatus. The surface temperature of the recording medium can be controlled by only the ink-jet recording apparatus by heating the recording medium before or during transportation of the recording medium by the installed heater.

According to the present invention, it is characterized by using the recording medium comprising one selected from the group consisting of a polyvinyl chloride or a resin substrate without a plasticizer and a non-absorbable inorganic substrate as a constituent of recording medium for forming an image thereon by using the non-aqueous ink-jet ink of the present invention.

The recording medium to be used in the ink-jet recording method of the invention is preferably one made from polyvinyl chloride. Concrete examples of the recording medium composed of polyvinyl chloride include SOL-371G, SOL-373M and SOL-4701 each manufactured by Bigtechnos Co., Ltd., Glossy Vinyl Chloride manufactured by Systemgraphy Co., Ltd., KSM-VS, KSM-VST and KSM-VT each manufactured by Kimoto Co., Ltd., J-CAL-HGX, J-CAL-YHG and J-CAL-WWWG each manufactured by Kyosho Osaka Co., Ltd., BUS MARK V400 F vinyl and LITECca1 V-600 vinyl each manufactured by Flexcon Co., Ltd., FR2 manufactured by Hanwah Co., Ltd., LLBAU13713 and LLSP20133 each manufactured by Sakurai Co., Ltd., P-370B and P-400M each manufactured by Kanbo Pras Co., Ltd., S02P, S13P, S14P, S22P, S24P, S34P and S27P each manufactured by Grafityp Co., Ltd., P-223RW, P-224RW and P-284ZC each manufactured by Lintec Co., Ltd., LKG-19, LPA-70, LPE-248, LPM-45, LTG-11 and LTG-21 each manufactured by Shinseisha Co., Ltd., MP13023 manufactured by Toyo Corporation Co., Ltd., Napoleon Gloss glossy vinyl chloride manufactured by Niki Electronics Co., Ltd., JV-610 and Y-114 each manufactured by IKC Co., Ltd., NIJ-CAPVC and NIJ-SPVCGT each manufactured by Nichie Co., Ltd., 3101/H12/P4, 3104/H12/P4, 3104/H12/P4S, 9800/H12/P4, 3100/H12/R2, 3101/H12/R2, 3104/H12/R2, 1445/H14/P3 and 1438/One Way Vision each manufactured by Inetrocoat Co., Ltd., JT5129PM, JT5128P, JT5822P, JT5829P, JT5829R, JT5829PM, JT5829RM and JT5929PM each manufactured by Mactac Co., Ltd., MPI11005, MPI1900, MPI2000, MPI2001, MPI2002, MPI3000, MPI3021, MP13500 and MPI3501 each manufactured by Avery Co., Ltd., MA-101G and MA-501G each manufactured by Gin'ich Co., Ltd., FR2 manufactured by Hanfa Japan Co., Ltd., AY-15P, AY-60P, AY-80P, DBSP137GGH and DBSP137GGL each manufactured by Insite Co., Ltd., SJT-V200F and SJT-V400E-1 each manufactured by Hiraoka Shokusen Co., Ltd., SPS-98, SPSM-98, SPSH-98, SVGL-137, SVGS-137, MD3-200, MD3-301M, MD5-100, MD5-101M and MD %-105 each manufactured by Metamark Co., Ltd., 640M, 641G, 641M, 3105M, 3105SG, 3162G, 3164G, 3164M, 3164XG, 3164XM, 3165G, 3165SG, 3165M, 3451SG, 3551G, 3551M, 3631, 3141M, 3651G, 3651M, 3651SG, 3951G and 3641M each manufactured by Orafol Co., Ltd., SVTL-HQ 130 manufactured by Lami Corporation Co., Ltd., SP300 GWF and SPECLEAD vinyl each manufactured by Catalina Co., Ltd., RM-SJR manufactured by Ryoyo Shoji Co., Ltd., Hi Lucky and New Lucky PVC manufactured by LG Co., Ltd., SIY-110, SIY-310 and SIY-320 each manufactured by Sekisui Co., Ltd., PRINT MI Frontlit and PRINT XL Light weight banner each manufactured by Endutex Co., Ltd., RILET 100, RIJET 145 and RIJET 165 each manufactured by Ritrama Co., Ltd., NM-SG and NM-SM each manufactured by Nichiei Kako Co., Ltd., LTO3SG manufactured by Lukio Co., Ltd., Easy Print 80 and Performance Print 80 each manufactured by Jetgraph Co., Ltd., DSE 550, DSB550, DSE 800G, DSE 802/137, V250WG, V300WG and V350WG each manufactured by Hexis Co., Ltd., and Digital White 6005PE and 6010PE each manufactured by Multifix Co., Ltd.

As a recording medium having a constituent element of a resin substrate without containing a plasticizer or a non-absorbable inorganic substrate, a various substrate below is usable as a constituent element in alone or in combination with a plural kind of substrate. Specific example of a resin substrate without containing a plasticizer include: ABS resin, polycarbonate resin (PC), polyacetal resin (POM), polyamide resin (PA), polyethylene terephthalate resin (PET), polyimide resin (PI), acryl resin, polyethylene resin (PE), polypropylene resin (PP), and polyvinyl chloride resin (PVC) without containing a plasticizer.

These resin features resin without containing a plasticizer and other characteristic such as thickness, shape, color, softening temperature, or hardness is not particularly limited.

Preferred recording medium used to the present invention is ABS resin, PET resin, PC resin, POM resin, PA resin, PI resin, hard PVC resin without containing a plasticizer, acryl resin, PE resin and PP resin, more preferably ABS resin, PET resin, PC resin, PA resin, hard PVC resin without containing a plasticizer, and acryl resin.

Specific example of a non-absorbable inorganic substrate include: a glass plate, a metal plate such as iron or aluminum, and a ceramic plate. These inorganic substrate features surface without having an ink absorbable layer and other characteristic such as thickness, shape, color, softening temperature, or hardness is not particularly limited.

EXAMPLES

The invention is concretely described referring examples below though the invention is not limited to them. In the invention, "part" and "%" are each "part by mass" and "% by mass", respectively, as long as any specific comment is not attached.

Example 1

<<Preparation of Ink>>
[Preparation of Ink 1]
<Preparation of Pigment Dispersion 1>

Ten parts of C.I. Pigment Blue 15:3 (hereinafter referred to as P1), 5 parts of pigment dispersant AJISPER PB822 (manufactured by Ajimnomoto Fine Tech.), 5 parts of Sulfolane (S-1) as Compound (A), and 80 parts of diethylene glycol diethyl ether as Compound (B) were mixed and dispersed by a horizontal type beads mill System Zeta mini, manufactured by Ashizawa Co., Ltd., together with 60% by volume of zirconia beads having a diameter of 0.5 mm. After that the zirconia beads were removed to obtain Pigment Dispersion 1. Herein, a concentration of metal ion about sodium, potassium, magnesium and calcium included in Pigment P1 were measured by ICP emission spectrophotometer and the results were shown in Table 1.

<Preparation of Resin Solution 1>

Five parts of sulfolane as Compound (A), 85 parts of ethylene glycol diethyl ether as Compound (B) and 10 parts of vinyl chloride-vinyl acetate copolymer synthesized by solution polymerization method having a number average molecular weight of 19,000, VMCC manufactured by Dow Chemicals Co., Ltd, were mixed and dissolved to prepare Resin Solution 1.

<Preparation of Ink>
Fifty parts of Pigment Dispersion 1 was mixed with 50 parts of the above Resin Solution 1 while stirring and filtered through a filter of 0.8 μm to obtain Ink 1. Herein, a concentration of metal ion about sodium, potassium, magnesium and calcium included in Pigment PI were measured by ICP emission spectrophotometer. Concentration of sodium ion exists most and is 68 ppm as shown in Table 2.

[Preparation of ink 2]
Seventy parts of pure water was mixed with 30 parts of Pigment P1, washed by stirring 2 hours, filtered and dried to obtain Pigment P1W.

Ink 2 was prepared in the same manner as preparation of Ink 1 except for using Pigment P1W instead of Pigment PI. Herein, a content of each metal salt in Ink 2 was measured by ICP emission spectrophotometer. Concentration of sodium ion exists most and is 33 ppm as shown in Table 2.

[Preparation of Inks 3 to 13]
Inks 3 to 13 were prepared in the same manner as in Ink 2 except that the kind of pigment and fixing resin, the kind and adding amount of Compound (A) and Compound (B) and the kind and the adding amount of another solvent were changed as described in Table 2, and further as for Pigment P1W, the concentration of metal salt in inks were changed by changing the amount of running pure water used and the time of stirring for washing process appropriately. Concentration of metal ion exists in each ink were measured. Concentration of sodium ion exists most. Those values (ppm) were shown in Table 2.

[Preparation of Inks 14 to 16]
Inks 14 to 16 were prepared in the preparation of Ink 1 above by changing the kind and adding amount of fixing resin and Compound (A), the kind and adding amount of Compound (B) and the kind and the adding amount of another solvent as described in Table 2. Concentration of metal ion about sodium, potassium, magnesium or calcium exists in each ink were measured. Concentration of sodium ion exists most. Those values (ppm) were shown in Table 2.

[Preparation of Inks 17 to 22]
As the same manner In the preparation of Ink 1 above, according to the combination described in Table 2, Inks 17 to 22 were prepared by using Pigment such as C.I. Pigment Yellow 150 (Pigment P2), Pigment P2W which was wash-treated on Pigment P2 in the same manner as Pigment P1W, C.I. Pigment Red 122 (Pigment P3), Pigment P3W which was wash-treated on Pigment P3 in the same manner as Pigment P1W, Pigment 4 which was C.I. Pigment Red 122 but had different production lot as Pigment 3, Pigment P4W which was wash-treated on Pigment P4 in the same manner as Pigment P1W instead of Pigment P1; and further the kind and adding amount Compound (A), Compound (B) and the kind and the adding amount of another solvent as described in Table 2.

Concentrations of metal ion about sodium, potassium, magnesium and calcium exists in above prepared inks were measured. Kind of most existing metal ion and its concentration value (ppm) was shown in Table 2. Measured metal ion concentration of sodium, potassium, magnesium and calcium in used Pigment P2 to P4 were shown in Table 1.

[Preparation of Ink 23]
Ink 23 was prepared in the same manner as preparation of Ink 1 except that Pigment P1 was changed to Pigment 5 which was C.I. Pigment Blue 15:4 but had different production lot as Pigment 1. Concentration of metal ion existed in Pigment P5 was measured as shown in Table 1. Further, concentration of metal ion concentration in Ink 23 was measured. Sodium ion exists most and the value was shown in Table 2.

TABLE 1

| Pigment No. | Pigment Kind | Metal ion concentration in Pigment (ppm) | | | | Remarks |
|---|---|---|---|---|---|---|
| | | $Na^+$ | $K^+$ | $Mg^+$ | $Ca^+$ | |
| P1 | PB15:4 | 1362 | 677 | 142 | 285 | Cyan pigment |
| P2 | PY150 | 1021 | 1774 | 186 | 261 | Yellow pigment |
| P3 | PR122 | 484 | 550 | 1183 | 677 | Magenta pigment |
| P4 | PR122 | 366 | 602 | 768 | 1321 | Magenta pigment |
| P5 | PB15:4 | 342 | 217 | 124 | 118 | Different lot of P1 |

Details of the additives described in abbreviations in Table 1 are as follows.
PB15:4: C.I. Pigment Blue 15:4
PY150: C.I. Pigment Yellow 150
PR122: C.I. Pigment Red 122

TABLE 2

| Ink No. | Pigment Kind | Pigment *1 | Fixing resin | Compound (A) Kind | Compound (A) *2 | Compound (B) Kind | Compound (B) *1 | Another solvent Solvent 1 Kind | Solvent 1 *1 | Solvent 2 Kind | Solvent 2 *1 | Metal ion concentration Kind | *1(ppm) | Remarks |
|---|---|---|---|---|---|---|---|---|---|---|---|---|---|---|
| 1 | P1 | No | PVC | S-1 | 5 | DEGDEE | 82.5 | — | — | — | — | $Na^+$ | 68 | Comp. |
| 2 | P1W | Yes | PVC | S-1 | 5 | DEGDEE | 82.5 | — | — | — | — | $Na^+$ | 33 | Inv. |
| 3 | P1W | Yes | PVC | S-1 | 2 | DEGDME | 73.5 | EGDAc | 10 | — | — | $Na^+$ | 5 | Inv. |
| 4 | P1W | Yes | PVC | S-1 | 13 | — | — | EGBEAc | 25 | EGDEE | 57.5 | $Na^+$ | 27 | Inv. |
| 5 | P1W | Yes | PVC | S-1 | 5 | DEGDEE | 74.5 | — | — | — | — | $Na^+$ | 14 | Inv. |
| 6 | P1W | Yes | PVC | S-1 | 18 | DEGDEE | 59.5 | — | — | — | — | $Na^+$ | 46 | Inv. |
| 7 | P1W | Yes | PVC | S-1 | 33 | DEGDEE | 54.5 | — | — | — | — | $Na^+$ | 6 | Inv. |
| 8 | P1W | Yes | PVC | S-2 | 5 | DEGDEE | 82.5 | — | — | — | — | $Na^+$ | 16 | Inv. |
| 9 | P1W | Yes | PVC | S-3 | 10 | DEGDEE | 77.5 | — | — | — | — | $Na^+$ | 26 | Inv. |
| 10 | P1W | Yes | PVC | — | — | DEGDEE | 82.5 | DMI | 5 | — | — | $Na^+$ | 25 | Inv. |
| 11 | P1W | Yes | PVC | — | — | DEGDEE | 82.5 | NMP | 5 | — | — | $Na^+$ | 15 | Inv. |
| 12 | P1W | Yes | Acryl | S-1 | 10 | DEGDME | 57.5 | EGDAc | 20 | — | — | $Na^+$ | 25 | Inv. |
| 13 | P1W | Yes | PVC | S-1 | 10 | DEGDEE | 77.5 | — | — | — | — | $Na^+$ | 53 | Comp. |
| 14 | P1 | No | PVC | S-1 | 10 | — | — | EGBEAc | 77.5 | — | — | $Na^+$ | 68 | Comp. |
| 15 | P1 | No | PVC | S-2 | 5 | DEGDME | 47.5 | EGBEAc | 35 | — | — | $Na^+$ | 67 | Comp. |
| 16 | P1 | No | PVC | — | — | — | — | NMP | 10 | EGBEAc | 77.5 | $Na^+$ | 67 | Comp. |
| 17 | P2 | No | PVC | S-1 | 6 | DEGDEE | 71.5 | EGDAc | 10 | — | — | $K^+$ | 89 | Comp. |
| 18 | P2W | Yes | PVC | S-1 | 6 | DEGDEE | 71.5 | EGDAc | 10 | — | — | $K^+$ | 17 | Inv. |
| 19 | P3 | No | PVC | S-2 | 5 | DEGDEE | 82.5 | — | — | — | — | $Mg^{2+}$ | 59 | Comp. |
| 20 | P3W | Yes | PVC | S-2 | 5 | DEGDEE | 82.5 | — | — | — | — | $Mg^{2+}$ | 14 | Inv. |

TABLE 2-continued

| Ink | Pigment | | Fixing | Compound (A) | | Compound (B) | | Another solvent | | | | Metal ion | | |
| | | | | | | | | Solvent 1 | | Solvent 2 | | concentration | | |
| No. | Kind | *1 | resin | Kind | *2 | Kind | *1 | Kind | *1 | Kind | *1 | Kind | *1(ppm) | Remarks |
|---|---|---|---|---|---|---|---|---|---|---|---|---|---|---|
| 21 | P4 | No | PVC | S-1 | 5 | DEGDME | 82.5 | — | — | — | — | — | $Ca^{2+}$ | 66 | Comp. |
| 22 | P4W | Yes | PVC | S-1 | 5 | DEGDME | 82.5 | — | — | — | — | — | $Ca^{2+}$ | 14 | Inv. |
| 23 | P5 | No | PVC | S-1 | 5 | DEGDEE | 82.5 | — | — | — | — | — | $Na^+$ | 17 | Inv. |

*1: Washing treatment,
*2: Content,
Inv.: Inventive, Comp.: Comparative

Details of the additives described in abbreviations in Table 2 are as follows. The numerical values of the content in Table 2 are % by mass unless otherwise noted.

[Fixing Resin]

PVC: Solution polymerized vinyl chloride-vinyl acetate copolymer (Commercial name: VMCA, manufactured by Dow Chemicals Co., Ltd.)

Acryl: Butyl methacrylate-methyl methacrylate copolymer (Commercial name: DEGLAN P24, manufactured by Degussa Co., Ltd.)

[Compound (A)]

S-1: Sulfolane (water soluble)
S-2: Dimethyl sulfoxide (water soluble)
S-3: Dimethyl sulfone (water soluble)

[Compound (B)]

DEGDEE: Diethylene glycol diethyl ether (water soluble)
DEGDME: Diethylene glycol dimethyl ether (water soluble)

[Another Solvent]

EGDAc: Ethylene glycol diacetate (non-water soluble)
DPGDEE: Dipropylene glycol diethyl ether (water soluble)
EGBEAc: Ethylene glycol monobutyl ether acetate (non-water soluble)
NMP: N-methylpyrrolidone (water soluble)
DMI: 1,3-Dimethyl imidazolidinone (water soluble)

<<Evaluation of Ink>>

Each of the above prepared inks was evaluated according to the following methods.

[Evaluation of Odor]

A 250 ml polyethylene bottle was filled half-full with each of the inks 1 to 23 and the odor of each of the samples was classified into five ranks by 30 testing persons. The sample judged as almost non-odor was given 1 point and that judged as very unpleasant order was given 5 points, and the order of the sample was evaluated according to the following norms.

A: The average point given by the 30 testers was not less than 4.0.

B: The average point given by the 30 testers was not less than 3.0 and less than 4.0.

C: The average point given by the 30 testers was not less than 2.0 and less than 3.0.

D: The average point given by the 30 testers was less than 2.0.

[Evaluation of Ejection Suitability]

Flying situation of ink droplets was monitored by a CCD camera under a condition in which the ejection cycle of the ink droplet and that of lighting was synchronized by using a piezo type head having a nozzle diameter of 28 μm, a driving frequency of 12 kHz, a nozzle number of 256, a minimum droplet volume of 14 μl, a nozzle density of 180 dpi (dpi is dot number per 2.54 cm) and a strobe type ink flight observing apparatus described in FIG. 2 of JP-A 2002-363469. The ejecting situation in an environment of 23° C., 55% R.H was evaluated according to the following norms. Moreover, the same evaluation was carried out about an ink which was stored 6 months at 23° C.

A: The ink droplets were normally ejected continuously after 5 L or more ink consumption.

B: The ink droplets were normally ejected continuously before 3 L or more ink consumption. However, speed fluctuation of the ink droplets was observed till 5 L ink consumption.

C: The ink droplets were normally ejected continuously before 2 L or more ink consumption. However, speed fluctuation of the ink droplets was observed till 3 L ink consumption.

D: Fluctuation in the flying speed of the ink droplets or lacking of ejection was observed till 2 L or more ink consumption.

<Evaluation of Durability of Head for Prolonged Duration>

Twenty three of the ink-jet head were prepared and Inks 1 to 23 were each charged into the heads respectively and the heats were stood at room temperature in such state. Each of the heads was installed in the recording apparatus every one week during four months and the image was formed under the same condition as above. The image formed after passing four months was evaluated to judge the durability of the head for the prolonged duration. Rank C or higher ranks were judged as acceptable level.

A: The image formed after passing four months was the same as that initially formed and the head was not deteriorated.

B: The image formed after four month was almost the same as that initially foiined even though variation in the density was observed at a part of the image and the ink-jet head was almost not deteriorated.

C: White lines were slightly observed on the image formed after passing of four months and the deterioration of the ink-jet head was partially caused.

D: Many white lines were observed on the image formed after passing of four months and the ink-jet head was considerably deteriorated.

<<Evaluation of Printed Image>>

[Formation of Image]

Each of the inks was charged into an on-demand type ink-jet printer having the maximum recording density of 720×720 dpi in which a piezo type head having a nozzle diameter of 28 μm, a driving frequency of 12 kHz, a nozzle number of 256, a minimum droplet volume of 14 μl and a nozzle density of 180 dpi and a heater were installed. The ink was ejected onto a polyvinyl chloride recording medium JT5929PM, manufactured by Mactac Co., Ltd., to record a solid image of 10 cm×10 cm. The temperature of the heater was set so that the surface temperature of the recording medium was held at 40° C. by heating from the backside of the recording medium during the printing. The surface temperature of the recording medium was measured by a noncontacting thermometer IT-530N manufactured by Horiba Seisakusho. Further, the same recording was carried out by using ink after storage of 6 months at room temperature.

[Evaluation of Image]

The images formed by each of Inks of immediately after preparation and after storage of 6 months at room temperature, were each evaluated according to the following method. In each of the evaluation items, Rank C or higher was judged as acceptable level.

<Evaluation of Abrasion Resistance>

The abrasion resistance of the image was evaluated according the following norms by rubbing the image surface by dry cotton.

A: The image was almost not varied even when the surface was rubbed for 51 or more times.

B: The image density was almost not influenced though damages were slightly formed on the surface of the image after rubbing for 50 times.

C: The image density was lowered during the rubbing for 20 to 49 times.

D: The image density was lowered during the rubbing for 20 times.

<Evaluation of Water Resistance>

The image formed on the polyvinyl chloride was rubbed by cotton cloth impregnated with water and water resistance water was evaluated according to the following norms.

A: The image is almost not varied even when the image was rubbed for 31 or more times.

B: The image density was almost not influenced though damages were slightly formed on the surface of the image after rubbing for 30 times.

C: The image density was lowered between 10 times to 29 times of the rubbing.

D: The image density was lowered by rubbing for less than 10 times.

Results obtained by the above tests were listed in Table 3.

TABLE 3

| Ink No. | Odor | Ejection suitability *1 | *2 | *3 | Abrasion resistance *2 | *3 | Water resistance *2 | *3 | Remarks |
|---|---|---|---|---|---|---|---|---|---|
| 1 | A | A | A | D | A | D | A | D | Comp. |
| 2 | A | A | A | B | A | B | A | A | Inv. |
| 3 | B | B | A | A | B | B | B | C | Inv. |
| 4 | C | B | B | B | A | A | A | A | Inv. |
| 5 | A | A | A | A | A | A | A | A | Inv. |
| 6 | A | B | A | C | A | C | A | C | Inv. |
| 7 | A | B | A | A | A | A | A | A | Inv. |
| 8 | A | A | A | A | A | A | A | A | Inv. |
| 9 | A | A | A | A | A | A | A | A | Inv. |
| 10 | B | A | A | A | B | A | A | A | Inv. |
| 11 | C | C | A | A | A | A | A | A | Inv. |
| 12 | B | A | A | A | C | C | B | B | Inv. |
| 13 | A | A | A | D | A | D | A | D | Comp. |
| 14 | D | A | A | A | A | A | A | A | Comp. |
| 15 | D | A | A | B | A | B | A | B | Comp. |
| 16 | D | A | A | A | A | A | A | A | Comp. |
| 17 | B | C | A | D | A | D | A | D | Comp. |
| 18 | B | A | A | A | A | A | A | A | Inv. |
| 19 | A | A | A | D | A | D | A | D | Comp. |
| 20 | A | A | A | A | A | A | A | A | Inv. |
| 21 | A | A | A | D | A | D | A | D | Comp. |
| 22 | A | A | A | A | A | A | A | A | Inv. |
| 23 | A | A | A | A | A | A | A | A | Inv. |

*1: Head durability for long term use,
*2: Immediately after preparation,
*3: After storage,
Inv.: Inventive, Comp.: Comparative As is cleared by the results listed in Table 3, the inks constituted according to the invention is superior to the comparative inks in all performances of the odor of the ink, the durability of the ink-jet head for the prolonged duration, the ejection suitability after long-term storage, abrasion resistance of the image recorded on the polyvinyl chloride recording medium and the water resistance.

Example 2

Each 1 L of Inks 1, 2, 4, 16 prepared in Example 1 were stored in tightly sealed bottle. After storing these bottles 6 months, each ink was filtered through mesh filter of 1 μm, the surface of the mesh filter after filtration was observed by the optical micrometer. No foreign matter caused by metal salt was noticed in Inks 2, 4, 16, however many crystalline of around 10 μm were noticed on the surface of filter. These crystalline were confirmed as sodium chloride by analysis result.

Example 3

Each Ink was prepared in the same manner as preparation of Inks 1 to 11, 13 to 23 described in Example 1, except that solution polymerized vinyl chloride-vinyl acetate copolymer (PVC: manufactured by Dow Chemicals) was changed to vinyl chloride-vinyl acetate-maleic anhydride copolymer, vinyl chloride-vinyl acetate-vinyl alcohol copolymer, and vinyl chloride-vinyl acetate-hydroxyalkyl acrylate copolymer. Each evaluation was carried out in the same manner described in Example 1. The same result in performances as described in Table 2 can be obtained as to each fixing resin.

Example 4

Images were formed by using Inks 1, 2, 5, 22 prepared in Example 1 on each recording medium described in Table 4 instead of polyvinyl chloride as the recording medium. Abrasion resistance and water resistance were evaluated in the same manner as described in Example 1. Results were shown in Table 4.

Details of the recording medium described in abbreviations in Table 4 are as follows.

PET: Polyethylene terephthalate sheet
PP: Polypropylene sheet
ABS: Acrylonitril-butadiene-styrene copolymer sheet
PC: Polycarbonate sheet
POM: Polyoxymethylene resin sheet
PA: polyacrylate
PI: Polyimide
PVC: Poly vinyl chloride
PE: Polyethylene

TABLE 4

| Ink No. | Recording medium Kind | Abrasion resistance *1 | *2 | Water resistance *1 | *2 | Remarks |
|---|---|---|---|---|---|---|
| 1 | White PET | A | D | A | D | Comp. |
| 2 | White PET | A | B | A | A | Inv. |
| 5 | White PET | A | A | A | A | Inv. |
| 22 | White PET | A | A | A | A | Inv. |
| 1 | White PP | B | D | B | D | Comp. |
| 2 | White PP | B | C | B | B | Inv. |
| 5 | White PP | B | B | B | B | Inv. |
| 22 | White PP | B | B | B | B | Inv. |
| 1 | Slight brown ABS | A | D | A | D | Comp. |

TABLE 4-continued

| Ink No. | Recording medium Kind | Abrasion resistance *1 | *2 | Water resistance *1 | *2 | Remarks |
|---|---|---|---|---|---|---|
| 2 | Slight brown ABS | A | B | A | A | Inv. |
| 5 | Slight brown ABS | A | A | A | A | Inv. |
| 22 | Slight brown ABS | A | A | A | A | Inv. |
| 1 | Aluminum plate | B | D | B | D | Comp. |
| 2 | Aluminum plate | B | C | B | B | Inv. |
| 5 | Aluminum plate | B | B | B | B | Inv. |
| 22 | Aluminum plate | B | B | B | B | Inv. |
| 5 | Transparent PC | A | A | A | A | Inv. |
| 5 | White POM | B | B | B | B | Inv. |
| 5 | White PA | A | A | A | A | Inv. |
| 5 | Slight yellow PI | A | A | A | A | Inv. |
| 5 | Transparent Hard PVC | A | A | A | A | Inv. |
| 5 | Transparent Acryl | A | A | A | A | Inv. |
| 5 | White PET | B | B | B | B | Inv. |
| 5 | Glass plate | B | B | B | B | Inv. |
| 5 | White ceramic plate | A | A | A | A | Inv. |

*1: Immediately after preparation,
*2: After storage,
Inv.: Inventive, Comp.: Comparative As is cleared by the results listed in Table 4, the inks constituted according to the invention exhibit excellent abrasion resistance and water resistance, provided that the image was recorded on the recording medium having constitution element of a polyvinyl chloride, a resin substrate without a plasticizer and a non-absorbable inorganic substrate.

What is claimed is:

1. A non-aqueous ink-jet ink comprising a pigment, a resin for fixing an image and an organic solvent, wherein
   60% or more by mass of the total mass of the organic solvent is accounted for by a water soluble organic solvent, and
   a content of a metal salt which is the highest in content among the salts of metals selected from the group of sodium, potassium, magnesium and calcium is 3 ppm to 50 ppm in terms of a concentration of a metal ion.

2. The non-aqueous ink-jet ink of claim 1, wherein
   the water soluble organic solvent comprises at least one selected from the group of glycol-based solvents, a nitrogen-containing heterocyclic compound, a sulfoxide compound and a sulfolane compound.

3. The non-aqueous ink-jet ink of claim 1, wherein
   the water soluble organic solvent comprises Compound (A) and Compound (B),
   a content of Compound (A) is 1.5% to 30% by mass, and a content of Compound (B) is 50% to 90% by mass;
   wherein Compound (A) is at least one selected from the group of compound represented by Formula (1) and Formula (2):

Formula (1)

wherein $R^1$ and $R^2$ each independently represent a group having 1-6 carbon atoms, and $R^1$ and $R^2$ may be jointed to form a ring,

Formula (2)

wherein $R^3$ and $R^4$ each independently represent a group having 1-6 carbon atoms, and $R^3$ and $R^4$ may be jointed to form a ring;
wherein Compound (B) is at least one selected from the group of compound represented by Formula (3):

$$R^5-(OX^1)_2-O-R^6$$ Formula (3)

wherein $R^5$ and $R^6$ each independently represent a methyl group or an ethyl group; and $OX^1$ represents an oxyethylene group or an oxypropylene group.

4. The non-aqueous ink-jet ink of claim 3,
wherein Compound (B) is at least one selected from the group of diethyleneglycol diethyl ether, dipropyleneglycol dimethyl ether, and dipropyleneglycol diethyl ether.

5. The non-aqueous ink-jet ink of claim 1, wherein the resin for fixing an image is produced by a solution polymerization method.

6. The non-aqueous ink-jet ink of claim 1,
wherein the resin has a number average molecular weight of from 10,000 to 30,000; and
the resin is one selected from the group of a vinyl chloride-vinyl acetate copolymer, a vinyl chloride-vinyl acetate-maleic anhydride copolymer, a vinyl chloride-vinyl acetate-vinyl alcohol copolymer and a vinyl chloride-vinyl acetate-hydroxyalkyl acrylate copolymer.

7. An inkjet recording method of forming an image on a recording medium by using the non-aqueous ink-jet ink of claim 1, wherein the recording medium comprising one selected from the group of a polyvinyl chloride or a resin substrate without a plasticizer and an non-absorbable inorganic substrate.

* * * * *